June 5, 1934. W. J. DE REAMER 1,961,342
CAKE PLATE
Filed Sept. 15, 1933
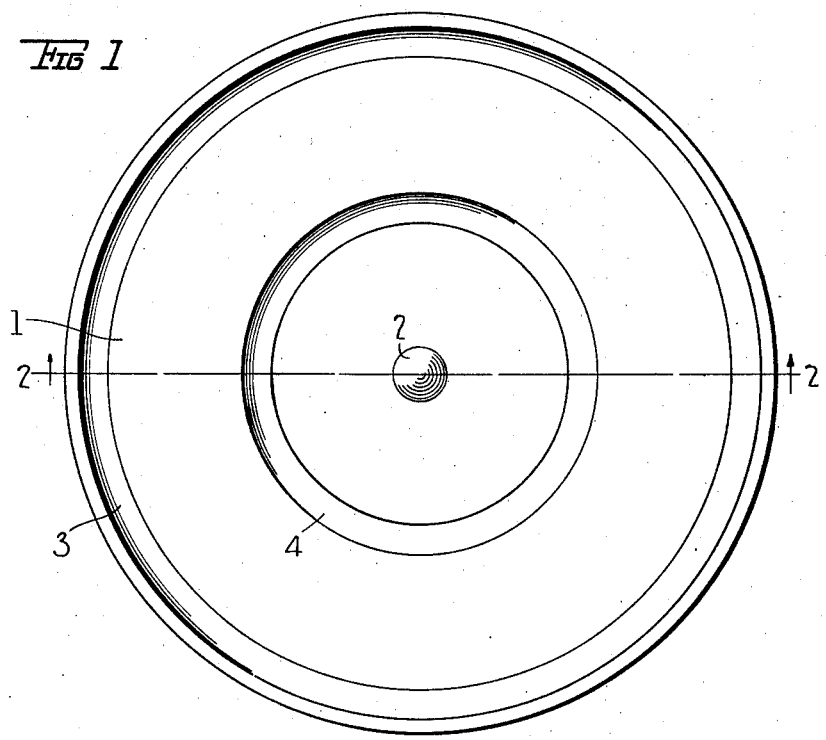
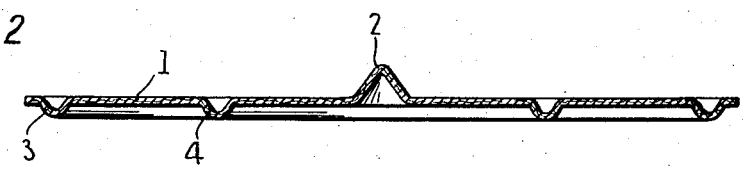
INVENTOR
William J. De Reamer
BY Staley + Welch
ATTORNEYS Patented June 5, 1934

1,961,342

UNITED STATES PATENT OFFICE 1,961,342

CAKE PLATE

William J. De Reamer, Crown Point, Ind., assignor to Mapes Consolidated Manufacturing Company, Griffith, Ind., a corporation of Delaware Application September 15, 1933, Serial No. 689,610

2 Claims. (Cl. 65—15)

This invention relates to a plate particularly adapted for supporting cakes, it more particularly relating to a plate of this character which is formed from moulded pulp, and especially to means to prevent the cake from skidding thereon.

The object of the invention is to provide a plate of the character described which will have simple and effective means to prevent the cake from slipping or skidding while the plate and the cake are being handled for the purpose of delivery by the baker to the dealer and placing it in a box or other container for delivery to the consumer.

In the accompanying drawing:

Fig. 1 is a plan view on the upper side of a plate embodying my improvements.

Fig. 2 is a section on the line 2—2 of Fig. 1.

Referring to the drawing, 1 represents a flat sheet of moulded pulp which in the present case is circular in form. In moulding the plate there is formed thereon a raised pointed projection 2 preferably positioned at the center. When a cake is set upon the upper side of the plate, this projection will embed itself in the material of the cake and thereby prevent the cake from slipping or skidding during handling.

To stiffen the plate there is formed thereon during the moulding operation a series of concentric ribs, two ribs 3 and 4 being shown in the present case; the rib 3 being near the outer edge of the plate and the rib 4 at an intermediate point between the projection 2 and the outer rim.

By the use of this plate, a cake is placed thereon immediately after the cake comes from the oven, the plate serving as a means to facilitate the ready handling of the cake both from the baker to the dealer and from the dealer to the consumer without the necessity of touching the cake with the hand. When it is desired to handle the cake the hand will be slipped under the plate which necessarily causes a preliminary tilting of the plate and cake thereon and unless provision is made to prevent it the cake will be apt to slide or slip on the plate. The pointed projection embedded in the cake effectively prevents this.

Having thus described my invention, I claim:

1. A cake plate formed of a circular piece of flat moulded pulp having a centrally positioned projection on the upper side thereof, said projection being pointed, and a plurality of concentric ribs formed on the lower side of said plate and all lying in the same horizontal plane.

2. A cake plate formed of a circular piece of flat moulded pulp having a centrally positioned projection on the upper side thereof, said projection being pointed, said plate having an outer concentric rib near the edge of the plate, and an inner concentric rib between the outer rib and the projection, said ribs projecting from the lower side of said plate and all lying in the same horizontal plane.

WILLIAM J. DE REAMER.